United States Patent [19]

Love

[11] Patent Number: 5,214,352

[45] Date of Patent: May 25, 1993

[54] LIGHT DIMMING SYSTEM FOR EMERGENCY OPERATION

[75] Inventor: Roger Love, Glen Gardner, N.J.

[73] Assignee: Computer Power Inc., High Bridge, N.J.

[21] Appl. No.: 712,353

[22] Filed: Jun. 7, 1991

[51] Int. Cl.$^5$ .......................................... H05B 37/02
[52] U.S. Cl. ...................................... 315/86; 315/174
[58] Field of Search ................. 315/86, 160, 174, 175; 307/64, 66

[56] References Cited

U.S. PATENT DOCUMENTS

| | | | |
|---|---|---|---|
| 3,373,313 | 3/1968 | Prines et al. | 315/86 |
| 3,836,817 | 9/1974 | Herzog | 315/86 |
| 3,869,639 | 3/1975 | Herzog | 315/86 |
| 4,477,748 | 10/1984 | Grubbs | 315/306 |
| 4,587,460 | 5/1986 | Murayama et al. | 315/174 |
| 4,688,154 | 8/1987 | Nilssen | 315/147 |
| 4,803,406 | 2/1989 | Yasuda | 315/174 |
| 5,099,176 | 3/1992 | Fellows et al. | 315/86 |

*Primary Examiner*—David Mis
*Attorney, Agent, or Firm*—Darby & Darby

[57] ABSTRACT

An emergency lighting system utilizing standard non-emergency circuitry to provide power to all of the light fixtures in a facility during a power failure. This emergency lighting system uses an electronic inverter to convert d.c. power stored in batteries to either a high or low frequency a.c. power which is supplied to the facility's standard light circuitry. The high or low frequency a.c. power generated by the inverter causes the output voltage of the ballast within each of the facility's fluorescent and/or HID lamps to decrease, thereby reducing the illumination intensity of each of these lamps and saving battery power. Since the incandescent, electroluminescent or L.E.D. exit signs of the facility are generally insensitive to a change in the frequency of the a.c. power, each of these lights continues to operate at full brilliance. Alternatively, a chopper regulator may be used to lower the average voltage level of the power provided to the facility's light circuitry.

24 Claims, 3 Drawing Sheets

LIGHT DIMMING SYSTEM FOR EMERGENCY OPERATION

BACKGROUND OF THE INVENTION

The present invention relates to an efficient lighting system which provides both normal and emergency lighting throughout a facility.

Electrical codes, both state and national, require that certain public places, for example schools, restaurants, hospitals and work places, have emergency lighting which is activated automatically in the event of a power failure. There are generally two main types of emergency lighting systems in common use, i.e., the individual unit and the Central Inverter System ("CIS"). The individual unit light is basically a set of floodlights connected to a battery. A charging and sensing circuit in the unit is connected to the standard a.c. power line and uses it to keep the battery charged, as well as to detect a power failure. When a power failure is detected, the circuit turns on the floodlights. Many of these individual units need to be spaced about a large area in order to properly illuminate it in an emergency.

The Central Inverter System or CIS also includes a battery as well as charging and sensing circuits connected to the standard a.c. line. These circuits keep the battery charged and detect a power failure. However, the CIS also includes an inverter to convert d.c. power from batteries to a.c. power. Rather that supplying a single set of floodlights, the inverter output is supplied to dedicated emergency lighting circuits. These emergency circuits are wired to cause illumination of all exit signs and selected fluorescent and High Intensity Discharge ("HID") lamps. HID lamps include high pressure sodium and mercury vapor lamps.

In a typical office, the CIS is wired to power only one fluorescent and/or HID light in every five to ten throughout most of the facility. It would be cost prohibitive to supply emergency power to all fixtures as it would rapidly drain the batteries and provide lighting levels many times that required by code. Consequently, only a sufficient number of fluorescent and/or HID light fixtures are powered to provide the minimum light between fixtures that is required by code. Incandescent, electroluminescent or L.E.D. light sources are used at emergency exits and are generally required by law to be fully illuminated. Therefore, some areas in a work space, and all of the areas at exits, will be completely illuminated, while other areas will only be dimly lit.

A single CIS system is more desirable in larger lighting systems than hundreds of individual unit lights because it is more cost effective. However, since in those CIS systems known in the art only selected lighting fixtures are powered, a separate dedicated emergency wiring system must be installed. This can make initial or retrofit installations expensive.

Emergency lighting systems involving the application of high frequency input voltage are known in the art. For example, U.S. Pat. Nos. 3,836,815; 3,869,639; 4,477,748; 4,587,460; 4,686,424; 4,688,154 and U.S. Pat. No. 4,803,406 disclose lighting systems that involve the application of a high frequency input voltage. These systems use the high frequency input, typically several thousand cycles per second, for the purpose of increasing the efficiency and operating life of the lamps during either normal or emergency conditions. None of these known systems provides a means by which all of the lights in a facility are illuminated at a higher frequency only when there is a power failure.

The presence of some unilluminated areas in a facility represents a hazard to people trying to leave a work space during an emergency. It is an object of this invention to eliminate this hazard by providing uniform low level emergency lighting during a utility power failure.

SUMMARY OF THE INVENTION

The present invention is directed to a lighting system which utilizes either a high or low frequency a.c. power emergency mode for the purpose of evenly distributing reduced light output of the fluorescent and HID lights of a facility, while providing full illumination for the facility's non-fluorescent/non-HID type lamps. For the purpose of this invention, fluorescent and HID lights comprise all ballast driven gaseous discharge lights including those driven by inductive or capacitive ballasts.

With the present invention, each fluorescent and/or HID light of the system will operate with less intensity; but, the cumulative light output from all the lights within a given area can be equivalent to the minimum intensity created by fully illuminating one in a group of several lamps as in the prior art. The illumination with the present invention, however, will be evenly spread over the area. Thus, dim areas followed by areas of great brightness are eliminated. In addition, since this emergency lighting system operates over the standard electrical lighting circuitry, the costs associated with installing dedicated wiring required by the previous CIS technologies known in the art, are eliminated.

In an illustrative embodiment of the invention, a component of the CIS detects the occurrence of a power failure. At this time, a battery system, which has stored power provided by a public utility prior to the power failure, delivers d.c. power to the system's inverter. The inverter converts the d.c. power to a.c. power having a frequency greater than the frequency of the power provided by the utility. The frequency of the inverter's output must be high enough to cause the voltage applied to the fluorescent and/or HID lamp to be reduced by the inductive ballast of the light. The high frequency output power generated by the inverter is supplied to the facility's standard light circuitry, thereby causing the output voltage of the magnetic ballast transformer in each of the facility's fluorescent and/or HID lights to decrease. As a result, the illumination intensity and power drain of each fluorescent and/or HID lighting fixture are reduced. Since the non-fluorescent/non-HID exit signs of the facility are generally insensitive to a change in the frequency of the a.c. voltage supplied to them, each of these lights continues to operate at full illumination.

Alternatively, in this embodiment of the invention, the inverter may deliver a.c. voltage having a reduced frequency to fluorescent and/or HID lights driven by capacitive rather than inductive ballasts. Since the output of capacitive ballast decreases with a decrease in the frequency of the voltage applied to them, this configuration of the invention produces the same net effect as that previously described.

In a second illustrative embodiment of the invention, during a power failure the level of the a.c. power delivered to the fluorescent and/or HID lights in the facility from an inverter is reduced by a voltage chopper while its frequency remains unchanged. This voltage chopper must be capable of reducing the average value of the a.c. energy as the peak value of its voltage essentially remains constant, e.g. by blocking a portion of each cycle. As a result, the illumination intensity of the fluorescent and/or HID lights in the facility is decreased even though the frequency of the voltage applied to the light circuitry remains constant. By means of a separate circuit, the full voltage from the inverter is applied to the exit lights so that they are fully illuminated. Alternatively, a separate battery backup may be provided at each exit light.

BRIEF DESCRIPTION OF THE DRAWINGS

The foregoing and other features of the present invention will be more readily apparent from the following detailed description and drawings of illustrative embodiments of the invention wherein.

DETAILED DESCRIPTION OF PREFERRED EMBODIMENTS

Figure 1:
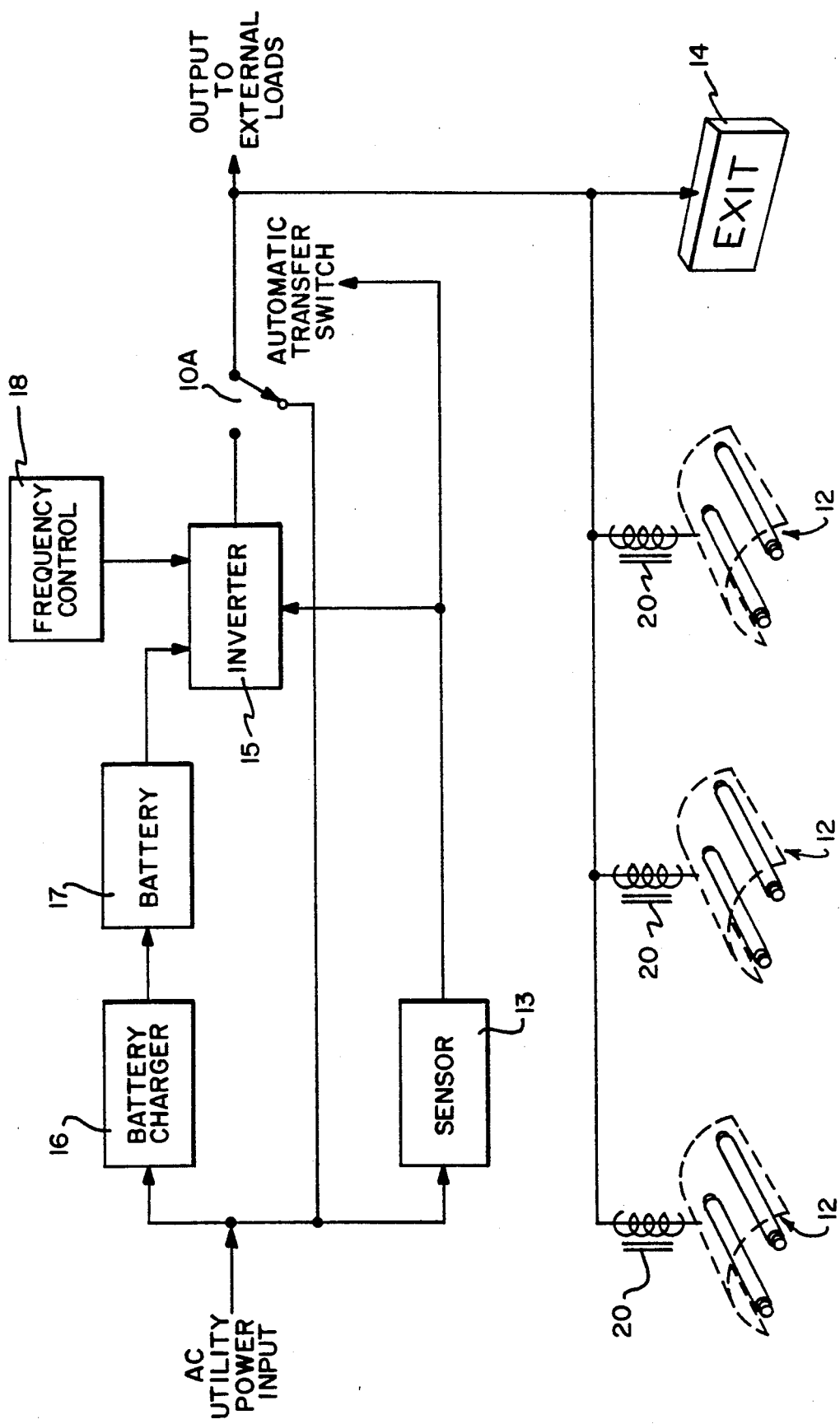
FIG. 1 is an illustrative embodiment of the invention in a typical lighting system incorporating a frequency changing inverter.

An emergency lighting system according to the present invention is shown in FIG. 1. In FIG. 1, standard a.c. power is applied to the system. This a.c. power is passed through a switch 10A to the lighting ballasts 20 of gaseous discharge lamps, e.g. fluorescent and/or HID lights 12, and also to the non-fluorescent lighting, e.g. incandescent, electroluminescent or L.E.D., fixtures 14 which illuminate exit signs. During this normal operation, a.c. power is also supplied to a battery charger 16 which in turn charges a battery 17.

A sensing circuit 13 monitors the a.c. power line. When the a.c. power 13 generates a signal which causes switch s and inverter 15 to begin operation the d.c. voltage from battery 17 to generate an a.c. voltage at its output which is substantially at the same voltage level as the a.c. input from the public utility. This a.c. voltage from inverter 15 then passes through 'switch 10A to the fluorescent/HID and non-fluorescent lights 12, 14.

According to one embodiment of the present invention, a frequency control circuit 18, which may be part of inverter 15, causes the a.c. frequency of the output of inverter 15 to be substantially higher than the normal utility frequency. Thus, instead of a conventional 60 Hz voltage being applied to the lamps, a higher frequency in the range of, but not limited to, 250 to 1000 Hz is applied to them. The non-fluorescent lamp 14 is relatively insensitive to this change in frequency and will still produce its required output illumination with the normal voltage levels from the inverter. However, the magnetic ballasts 20 are sensitive to the higher frequency and will produce a lower voltage at the fluorescent and/or HID lights 12 which will therefore operate at a much reduced light output level. For example, the fluorescent and/or HID light output will be reduced to typically, but not limited to, twenty percent of its normal level.

Since all of the fluorescent and/or HID lights located throughout a work space may now be illuminated, although at a much reduced level, a uniform illumination is provided throughout the area. This makes evacuation in emergency conditions much safer. Since the output of inverter 15 is supplied to the same wiring as the conventional a.c. power, installation of this system does not require expensive separate wiring to the emergency lamps.

The typical fluorescent and/or HID lights operate at reduced output with a higher frequency because the ballast 20 within every fluorescent or HID lighting fixture in the U.S. acts as a transformer that converts the input a.c. voltage to the voltage necessary to operate the fluorescent and/or HID lamps. When the frequency of the electrical power to the magnetic ballast transformer increases, the output decreases due to the inductive reactance. The voltage level to the fluorescent and/or HID lighting tubes decreases. This in turn decreases the fluorescent or HID light output.

The incandescent, electroluminescent or L.E.D. exit signs, however, are generally not frequency sensitive. Thus, their light output remains nearly constant, even though powered by an increased frequency during emergency conditions. Thus, the present invention satisfies the code requirements of substantially reduced emergency lighting in the protected zone, but near full brilliance for the exit signs.

The effect described above can also be accomplished by supplying an a.c. voltage with a frequency lower than that of utility power to capacitive, rather than magnetic, ballast driven gaseous discharge lights, e.g. fluorescent or HID lights.

When the present invention is applied to HID lighting circuitry, the time required for switch 10A to transfer the source of power to the lighting loads during an emergency power failure must be very short, preferably less than one-half cycle. Otherwise, the HID lights may go out and it may take approximately fifteen minutes to restart them.

Figure 2:
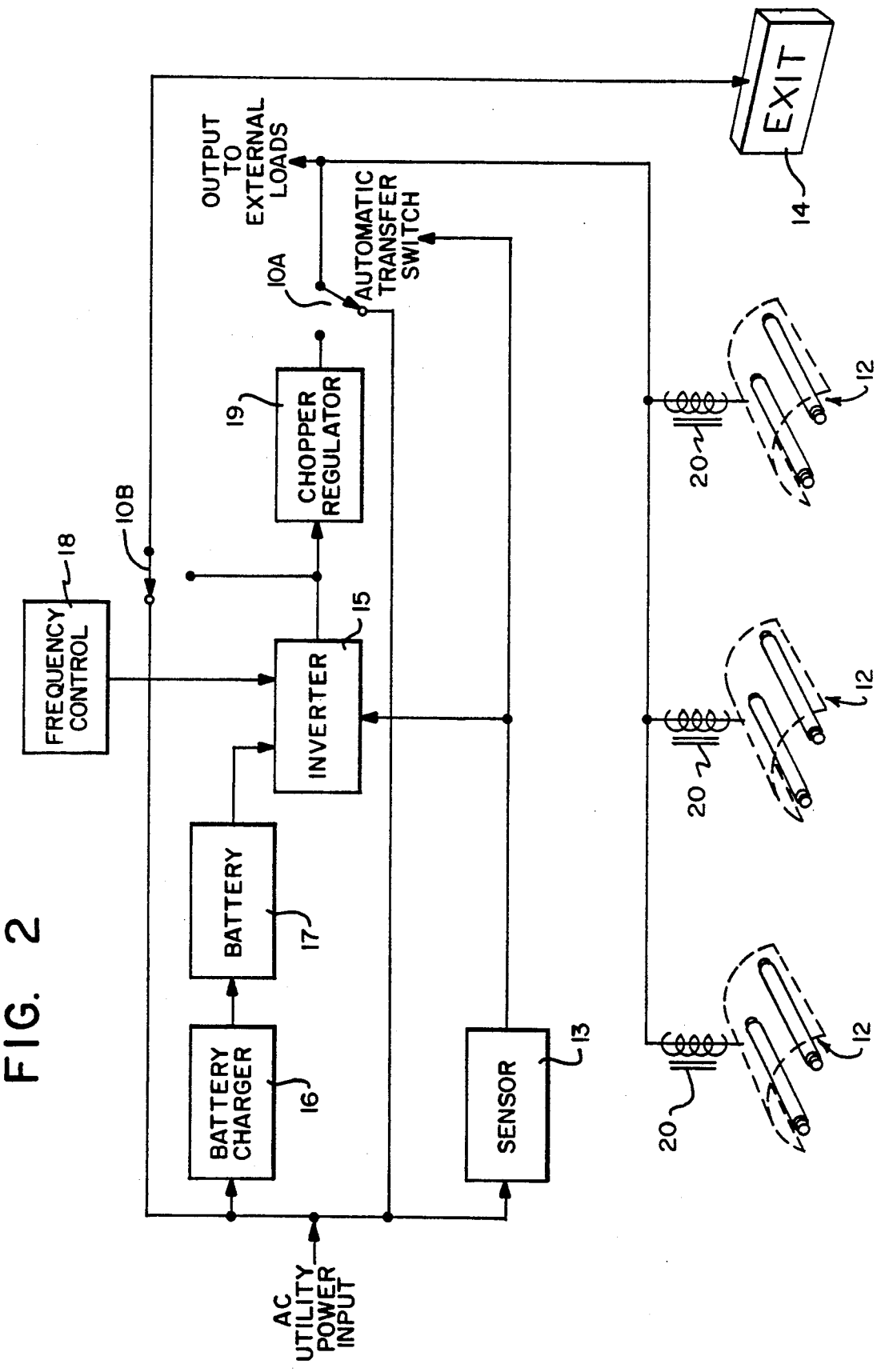
FIG. 2 is an illustrative embodiment of the invention incorporating a voltage chopper.

In FIG. 2, an emergency lighting system is shown in which the frequency control circuit 18 is set at the incoming utility frequency. In order to reduce the light output of the fluorescent and/or HID lighting fixtures 12 in the system, the average level of the voltage or power applied to the fixtures by a chopper regulator 19 is reduced. The chopper regulator effectively uses a semiconductor, e.g. an SCR, to turn off the a.c. voltage for a portion at each cycle, thereby reducing the average power output. With this system, the output of the inverter 15 is supplied directly to the non-fluorescent lights at the exits through switch 10B, and does not pass through the chopper regulator 19. As a result, these exit lights receive full illumination. While this requires some extra wiring to the exit lights, it is less extensive than the emergency wiring needed in prior art CIS arrangements which also include additional wiring to the fluorescent and/or HID lights.

Figure 3:
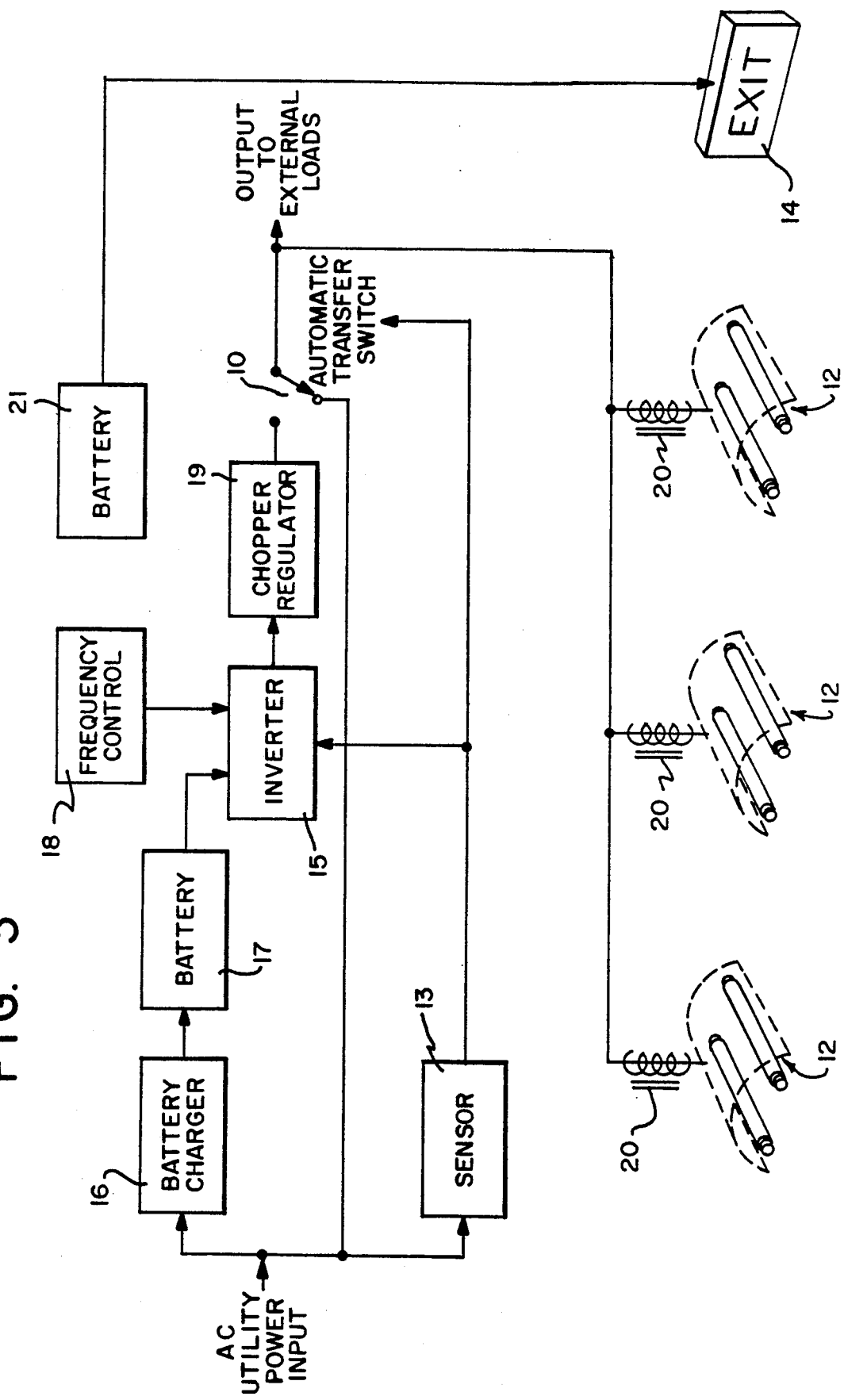
FIG. 3 is an illustrative embodiment of the invention incorporating a battery.

In FIG. 3, an emergency lighting system similar to that of FIG. 2 is shown. However, in this system, each of the nonfluorescent lights at the exits of the facility is powered by a battery 21 rather than the output of inverter 15. This system, like that of FIG. 2, also requires some extra wiring to the exit lights. However, if each exit sign is powered by its own battery, this wiring is localized and easy to accomplish.

While the invention has been particularly shown and described with reference to a preferred embodiment thereof, it will be understood to those skilled in the art that various changes in form and details may be made therein without departing from the spirit and scope of the invention.

What is claimed is:

1. An emergency lighting system for ballast driven gaseous discharge lighting means for providing light throughout a space, comprising:

ballasted gaseous discharge lighting means, said lighting means in normal use being connected by conventional wiring directly to a source of a.c. power, which wiring and power source cause said lighting means to provide normal illumination;

detector means for indicating as an emergency condition, the absence of said a.c. power from said power source;

battery means with a d.c. voltage output;

inverter means connected to the d.c. voltage output of said battery means for producing an inverter a.c. voltage at an output of the inverter means in response to said detector indicating the emergency condition;

means for disconnecting from said a.c. power source and for connecting the inverter a.c. voltage to the lighting means via said conventional wiring in response to detection of said emergency condition; and light intensity reducing means for altering the inverter a.c. voltage output, said altered a.c. voltage output causing the illumination produced by said discharge lighting means to be reduced.

2. An emergency lighting system for ballast driven gaseous discharge lighting means for providing light throughout a space, said lighting means being connected to a source of a.c. power which cause such lighting means to provide normal illumination, comprising;

detector means for indicating as an emergency condition, the absence of said a.c. power from said power source;

battery means with a d.c. voltage output;

inverter means connected to the d.c. voltage output of said battery means and producing an inverter a.c. voltage at an output of the inverter means in response to said detector indicating the emergency condition;

means for disconnecting from said a.c. power source and for connecting the inverter a.c. voltage to the lighting means in response to detection of said emergency condition; and power reduction means located between said inverter means a.c. output and said means for disconnecting and connecting, said inverter a.c. voltage output being reduced in average voltage by said reduction means, the reduced average a.c. voltage being applied to said discharge lighting means.

3. An emergency lighting system as in claim 2 wherein non-gaseous discharge exit lighting means located at access points to and from said space, are also normally connected to said a.c. power source for providing normal illumination, said disconnecting and connecting means connecting said exit lighting to said inverter means a.c. output in response to detection of said emergency condition, the inverter output voltage to said exit lighting being unaltered.

4. An emergency lighting system for ballast driven gaseous discharge lighting means for providing light throughout a space, said lighting means being connected to a source of a.c. power which cause such lighting means to provide normal illumination, comprising:

detector means for indicating as an emergency condition, the absence of said a.c. power from said power source;

battery means with a d.c. voltage output;

inverter means connected to the d.c. voltage output of said battery means and producing an inverter a.c. voltage at an output of the inverter means in response to said detector indicating the emergency condition;

means for disconnecting from said a.c. power source and for connecting the inverter a.c. voltage to the lighting means in response to detection of said emergency condition; and light intensity reducing means for altering the inverter a.c. voltage output, said altered a.c. voltage output causing the illumination produced by said discharge lighting means to be reduced, said discharge lighting means being driven by a magnetic ballast and said light intensity reducing means includes means for substantially increasing the frequency of the inverter a.c. voltage output to form said altered a.c. voltage.

5. An emergency lighting system as in claim 4 wherein non-gaseous discharge exit lights are located at access points to and from said space and connect to said a.c. power source to provide normal illumination, said means for disconnecting and connecting connecting said exit lighting means to said altered a.c. voltage output in response to detection of said emergency condition.

6. An emergency lighting system for ballast driven gaseous discharge lighting means for providing light throughout a space, said lighting means being connected to a source of a.c. power which cause such lighting means to provide normal illumination, comprising:

detector means for indicating as an emergency condition, the absence of said a.c. power from said power source;

battery means with a d.c. voltage output;

inverter means connected to the d.c. voltage output of said battery means and producing an inverter a.c. voltage at an output of the inverter means in response to said detector indicating the emergency condition;

means for disconnecting from said a.c. power source and for connecting the inverter a.c. voltage to the lighting means in response to detection of said emergency condition; and light intensity reducing means for altering the inverter a.c. voltage output, said altered a.c. voltage output causing the illumination produced by said discharge lighting means to be reduced, said discharge lighting means being driven by a capacitive ballast and said light intensity reducing means includes means for substantially decreasing the frequency of the inverter a.c. voltage output to produce said altered a.c. voltage.

7. An emergency lighting system for providing light through a space, comprising:

magnetic ballast driven gaseous discharge lighting means and non-ballast driven lighting means for exit sign illumination, said lighting means in normal use being connected by conventional wiring directly to a source of a.c. power at a frequency substantially equal to that of commercial utility power, which provides normal illumination from said lighting means, comprising;

detector means for indicating as an emergency condition, the absence of said a.c. power from said power source;

rechargeable battery means with a d.c. voltage output;

charger means for charging said battery means from said source of a.c. power;

inverter means connected to the d.c. voltage output of said battery means for producing an inverter a.c. voltage at an output of the inverter means in response to said detector indicating the emergency condition;

means for disconnecting said lighting means from said a.c. power source and for connecting the inverter a.c. voltage to the lighting means via said conventional wiring in response to detection of said emergency condition; and frequency means connected to the inverter means for causing the inverter means to produce the inverter a.c. voltage with a frequency sufficiently higher than that of the source of a.c. power to significantly reduce the power drawn by and luminance of said magnetic ballast driven gaseous discharge lighting means without significantly reducing the power drawn by and the luminance of said non-ballast driven lighting means, whereby in the absence of a.c. power from said source, said magnetic ballast driven gaseous discharge lighting means operate with an intensity reduced from normal and said non-ballast driven lighting means operate with substantially normal intensity.

8. An emergency lighting system as in claim 7, further comprising said lighting means, wherein said magnetic ballast driven gaseous discharge and high intensity discharge lamps including high pressure sodium and mercury vapor lamps; and wherein said non-ballast driven lighting means is at least one of the group of incandescent, electroluminescent and light emitting diode lights.

9. An emergency lighting system as claimed in claim 7 wherein the intensity of said magnetic ballast driven gaseous discharge lighting means is substantially reduced from its normal intensity.

10. An emergency lighting system as claimed in claim 7 wherein the frequency of the inverter a.c. voltage is substantially higher than normal utility frequency thereby causing a reduced voltage throughput to the gaseous discharge lighting means.

11. An emergency lighting system as claimed in claim 7 wherein said magnetic ballast driven gaseous discharge and non-ballast driven lighting means represent all of the normal lighting in the space, whereby separate wiring feeds from the inverter means to the lighting means to provide emergency lighting are eliminated.

12. An emergency lighting system as in claim 7 wherein said means for disconnecting and connecting is a switch means for connecting the a.c. output of said inverter to the lighting means whenever said detector means indicates the emergency, and for connecting the power source to the lighting means whenever there is no emergency.

13. An emergency lighting system for providing light through a space, comprising:

capacitive ballast driven gaseous discharge lighting means and non-ballast driven lighting means for exit sign illumination, said lighting means in normal use being connected by conventional wiring directly to a source of a.c. power at a frequency substantially equal to that of commercial utility power, which provides normal illumination from said lighting means, comprising;

detector means for indicating as an emergency condition, the absence of said a.c. power from said power source;

rechargeable battery means with a d.c. voltage output;

charger means for charging said battery means from said source of a.c. power;

inverter means connected to the d.c. voltage output of said battery means for producing an inverter a.c. voltage at an output of the inverter means in response to said detector indicating the emergency condition;

means for disconnecting said lighting means from said a.c. power source and for connecting the inverter a.c. voltage to the lighting means via said conventional wiring in response to detection of said emergency condition; and frequency means connected to the inverter means for causing the inverter means to produce the inverter a.c. voltage with a frequency sufficiently lower than that of the source of a.c. power to significantly reduce the power drawn by and luminance of said capacitive ballast driven gaseous discharge lighting means without significantly reducing the power drawn by and the luminance of said non-ballast driven lighting means, whereby in the absence of a.c. power from said source, said capacitive ballast driven gaseous discharge lighting means operate with an intensity reduced from normal and said non-ballast driven lighting means operate with substantially normal intensity.

14. An emergency lighting system as claimed in claim 13, wherein said capacitive ballast driven gaseous discharge lighting means is at least one of the group of fluorescent lights and high intensity discharge lamps including high pressure sodium and mercury vapor lamps; and wherein non-ballast driven lighting means is at least one of the group of incandescent and light emitting diode lights.

15. An emergency lighting system as claimed in claim 14 wherein said means for connecting is a switch means for connecting the a.c. output of said inverter to the lighting means whenever said detector means indicates the emergency, and the power source to the lighting means whenever there is no emergency.

16. An emergency lighting system as claim 13, wherein said battery means is a rechargeable battery, further comprising charger means for charging said battery means from said source of a.c. power in a normal condition of said a.c. source.

17. An emergency lighting system comprising:

ballast driven gaseous discharge lighting means for providing light through a space;

a source of a.c. power at a frequency generally equal to a frequency of commercial utility power applied to said lighting means for normal operation of the lighting means with normal intensity;

a rechargeable battery means with a d.c. voltage output;

a charger means for charging said battery means from said source of a.c. power;

detector means for indicating as an emergency condition, the absence of the a.c. power from said source;

an inverter means connected to the d.c. voltage output of said battery means and producing an inverter a.c. voltage at the output of the inverter, at least when said detector indicates the emergency condition;

a voltage control means connected to the output of the inverter means and producing an average a.c.

voltage at a level lower than that of the source of average a.c. power; and means for connecting the voltage control means to the ballast driven gaseous discharge lighting means, whereby the power drawn by and luminance of said ballast driven gaseous discharge lighting means is significantly reduced in the absence of a.c. power from said source.

18. An emergency lighting system as claimed in claim 17 wherein said voltage control means comprises an electronic chopper which turns off the inverter a.c. voltage for portions of a cycle.

19. An emergency lighting system as claimed in claim 17 further including a frequency control means connected to the inverter means for causing the inverter means to produce the inverter a.c. voltage with a frequency equal to that of the source of a.c. power.

20. An emergency lighting system as claimed in claim 17 further including non-ballast driven lighting means for providing exit sign illumination at access points to and from the space and means for connecting the inverter a.c. voltage to the non-ballast driven lighting means, whereby the non-ballast driven lighting means operate with substantially normal intensity.

21. An emergency lighting system as claimed in claim 17 further including non-ballast driven lighting means for providing exit sign illumination at access points to and from a space;

at least one charger means with a d.c. voltage output; and a means for connecting the charger d.c. voltage to the non-ballast driven lighting means, whereby the non-ballast driven lighting means operate with substantially normal intensity.

22. An emergency lighting system as claimed in claim 21 wherein said charger means comprises of a battery.

23. A central inverter emergency lighting system wherein an inverter has a capacity to supply a.c. power from a battery to all incandescent and L.E.D. exit lights operating at full illumination and to all magnetic ballast driven gaseous discharge lights operating at substantially reduced illumination in a space, said inverter supplying the a.c. power to said lights at a higher frequency than normal power source frequency via conventional wiring used in normal operation of said lights from the normal power source.

24. A central inverter emergency lighting system wherein an inverter has a capacity to supply a.c. power from a battery to all incandescent and light emitting diode exit lights operating at full illumination and to all capacitive ballast driven gaseous discharge lights operating at substantially reduced illumination in a space, said inverter supplying the a.c. power to said lights at a lower frequency than normal power source frequency via conventional wiring used in normal operation of said lights from the normal power source.

* * * * *